US006726125B1

(12) United States Patent
Nonis et al.

(10) Patent No.: US 6,726,125 B1
(45) Date of Patent: Apr. 27, 2004

(54) SPRAY GUN

(75) Inventors: Italo Nonis, Milton (CA); Manfred Missalla, Aurora (CA)

(73) Assignee: Marmospray 2000 Inc., Aurora (CA)

( * ) Notice: Subject to any disclaimer, the term of this patent is extended or adjusted under 35 U.S.C. 154(b) by 0 days.

(21) Appl. No.: 10/314,147

(22) Filed: Dec. 9, 2002

(51) Int. Cl.[7] .......................... A01G 25/14; B05B 9/00; B05B 7/02; B05B 9/01; B05B 1/00

(52) U.S. Cl. ....................... 239/375; 239/376; 239/379; 239/526; 239/600

(58) Field of Search ................................ 239/375, 376, 239/379, 526, 600, 302, 407, 456, 459, 650, 654

(56) References Cited

U.S. PATENT DOCUMENTS

| | | | | |
|---|---|---|---|---|
| 2,497,625 A | * | 2/1950 | Norwick | 239/417 |
| 2,887,274 A | * | 5/1959 | Swenson | 239/371 |
| 2,964,302 A | * | 12/1960 | Tombu | 366/11 |
| 3,236,459 A | * | 2/1966 | McRitchie | 239/416 |
| 4,364,521 A | * | 12/1982 | Stankowitz | 239/346 |
| 4,502,640 A | * | 3/1985 | Nonis | 239/346 |

* cited by examiner

*Primary Examiner*—Michael Mar
*Assistant Examiner*—Darren Gorman

(57) ABSTRACT

A spray gun suitable for spraying plaster and other particulate matter uses a series of easily replaceable elements for fast cleaning and changeover of the spray gun. A barrel portion of the gun has a supply chamber for receiving material to be sprayed. A slidable tube is mounted in the barrel portion and provides a jet of compressed air for forcing the material to be sprayed through a nozzle plate. A handle portion extends downwardly from the gun and supports a slidable trigger mechanism. The trigger mechanism includes a fixed member at one end thereof which is slidable on the slide tube trapped between an adjustable stop member and a further member secured on the slide tube. The adjustable stop member can also be used to position the slide tube for continuous operation independent of the trigger mechanism. The adjustable stop member is moved along the slide tube until it contacts the end of the barrel. Further movement moves the slide tube rearwardly and is held in the open position.

14 Claims, 1 Drawing Sheet

SPRAY GUN

FIELD OF THE INVENTION

The present invention relates to spray guns and in particular, relates to compressed air operated spray guns for applying plaster and other particulate material.

BACKGROUND OF THE INVENTION

Handheld spray guns for applying plaster and other particulate matter are well known. One particular spray gun which is proven acceptable in the field, is disclosed in our U.S. Pat. No. 4,502,640. This spray gun is easy to control and is not prone to plugging or jamming. Although the gun works well, it is somewhat time consuming to disassemble and clean. In addition there is no adjustment to hold the trigger in an operating position for spraying at a fixed rate which is suitable for large continuous applications. It is desirable to provide a spray gun which is easier to clean and can be disassembled and reassembled in a fast, efficient manner.

SUMMARY OF THE INVENTION

A spray gun for spraying of plaster and other particulate material comprises a barrel portion having a chamber for containing material to be sprayed, an entrance into the chamber for receiving the material to be sprayed, a slidable tube for providing a source of compressed air to the chamber and extending out of one end of the barrel portion, and a nozzle plate at the end of the barrel and selectively closable by the slidable tube. The slidable tube includes a spring bias member which is engaged by said slidable tube and is compressed by movement of the slideable tube away from the nozzle plate and provides a bias to close the nozzle. A handle portion of the gun extends downwardly from one end of the barrel and contains a slidable trigger mechanism. The slidable trigger mechanism includes a finger grip fixed on a shaft which is generally parallel to the slidable tube. The shaft of the slidable trigger mechanism includes a connecting link member at an end of the shaft opposite the finger grip. The link member is slidable on the slidable tube and trapped between an adjustable stop member on the slidable tube and a further member secured on the slidable tube. The trigger mechanism, when the finger grip is moved towards the handle portion, forces the link member to engage the further member and move the slidable tube away from the nozzle plate against the spring bias. Release of the finger grip allows the spring bias in combination with the adjustable stop to return the slidable tube to the closed position and in so doing, return the trigger mechanism to the closed position.

According to an aspect of the invention, the adjustable stop member is movable along the slidable tube to hold the slidable tube in an open position without actuation of the trigger mechanism.

In yet a further aspect of the invention, the slidable tube has a threaded portion at one end thereof and the adjustable stop member is threaded on the threaded portion. The biased slidable tube causes the adjustable stop member and the link member to return to an initial position when the trigger is released.

According to yet a further aspect of the invention, the handle portion includes an adjustable stop between the handle portion and the trigger to adjustably limit the extent the finger grip can move towards the handle portion. This allows the user to limit the maximum movement of the trigger and thereby define a maximum open position for a particular job.

In yet a further aspect of the invention, the adjustable stop member on the threaded portion of the slidable tube is adjustable to define different fully open positions of the slidable tube.

In yet a further aspect of the invention, the threaded portion of the slidable tube receives a control valve for adjusting the supply of compressed air through the slidable tube to the chamber of the barrel portion.

In yet a further aspect of the invention, the control valve has an extended threaded port for engagement with the threaded tube in various positions of the adjustable stop and forms a nut lock relationship therewith to maintain a particular position of the adjustable stop.

In yet a further aspect of the invention, the control valve is a fast shut off valve.

In yet a further aspect of the invention, the barrel portion includes a threaded port and an end opposite the nozzle plate which is closed by a threaded bearing which slidably supports the slidable tube.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
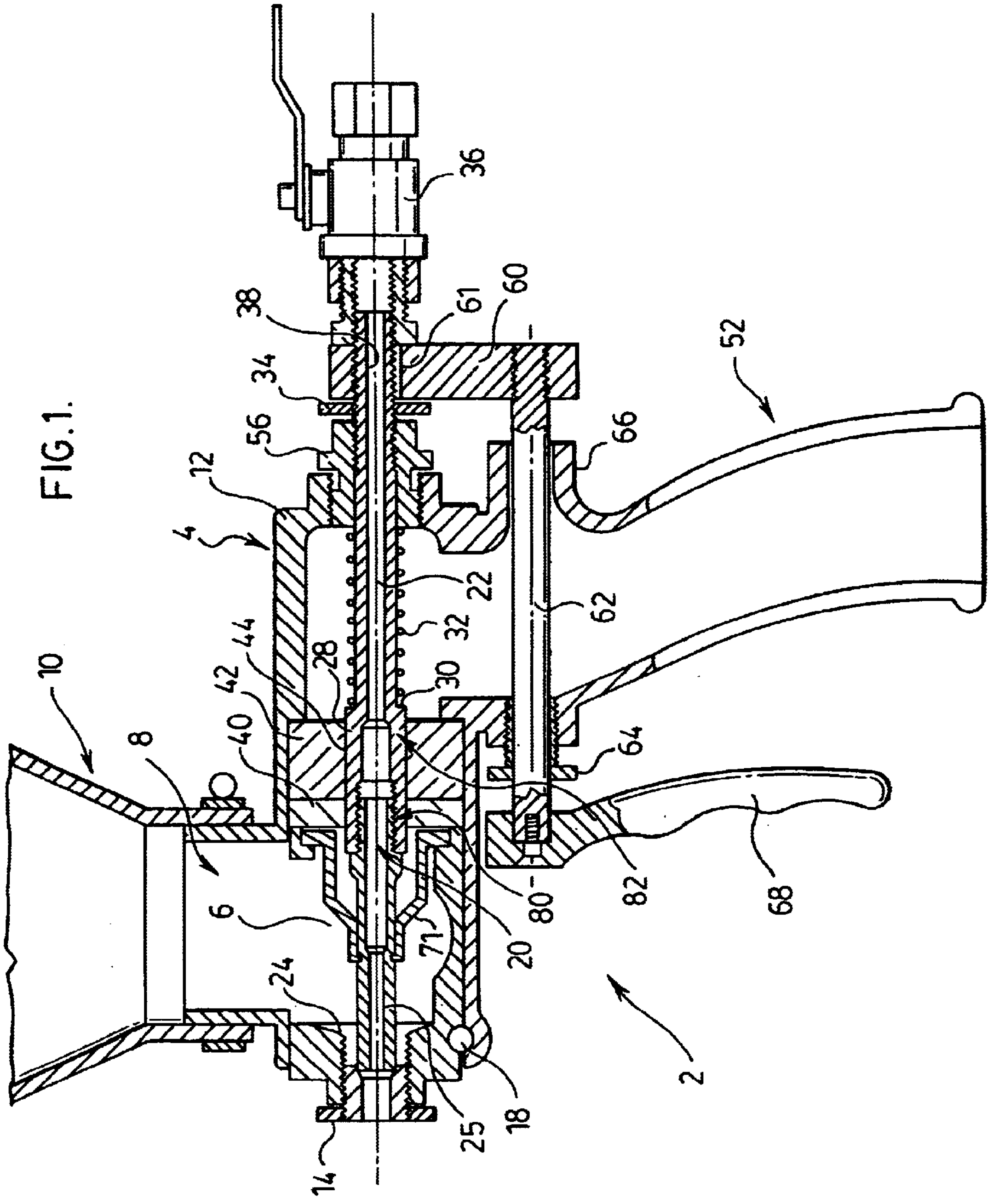
FIG. 1 is a partial sectional view showing the spray gun.

The spray gun 2 as shown in FIG. 1 has a barrel portion 4 which receives a replaceable barrel sleeve 12 having a supply chamber 6. A feed entrance 8 connects the hopper 10 with the chamber 6 and allows material to be sprayed to be forced through the gun. A replaceable nozzle 14 is provided at one end of the barrel sleeve 12.

A slide tube 20 forms part of the compressed air distribution system of the gun. The slide tube has a longitudinal air supply duct 22 running the length thereof. The slide tube 20 is of a composite structure having a replaceable slide tube tip 25 having a thread connection with the slide tube base 82. Preferably the slide tube base 82 is a stainless steel tube to provide additional strength at the rear of the gun. In particular, higher strength at the connection with the control valve 36 is desirable. The slide tube tip is preferably made of brass for cost considerations. The slide tube base 82 can be a composite structure but typically joined at the shoulder 30. The composite structure would have a stainless steel tube joining with the valve 36.

The replaceable nozzle 14 has a tapered end 24 for closing with the slide tube tip 25. The opposite end of the slide tube has a threaded end 38 which extends out of the barrel portion 4 and threadably receives the threaded thumb screw adjustment 34 and the threaded control valve 36. The control valve 36 allows the compressed air to be turned on or off and to also allow adjustment of the flow thereof. Preferably this is a fast shut off valve such as a ball valve which can move from an open to a closed position by rotation through 90 degrees.

The slide tube 20 is inwardly stepped at 28 to define shoulder 30. This shoulder provides a stop face for the coil of spring 32 which is slid over the threaded end of the tube and abuts against the shoulders 30.

The barrel portion at an end thereof opposite the replaceable nozzle 14 includes a threaded bearing 56. This threaded bearing allows sliding movement of the slide tube 20 along the length of the barrel. A further bearing is provided in the stop member 42 which forms one end of the chamber 6. This stop member 42 includes a port 44 for allowing sliding movement of the slide tube base 82. Preferably, this stop member is of a Teflon or plastic material.

As shown in FIG. 1, the coil bias spring 32 is effectively trapped between the threaded bearing 56 and the shoulder 30. The coil bias spring is exterior to the supply chamber 6 and is not in contact with the plaster mud or other material being applied. Movement of the sliding tube away from the replaceable nozzle 14 causes compression of the bias spring. Preferably in the closed position, there is some pressure exerted by the bias spring 32 urging the slide tube to engage and close the nozzle 14. The coil spring is in line with the silde tube and is positioned intermediate two support points of the slide tube. This keeps the spring force aligned with the slide tube axis and reduces trigger jamming.

It has been found with this arrangement that a slight vibration occurs with use of the spray gun which may be, caused by the cantilevered end of the slide tube through which compressed air is discharged. This slight vibration assists in the flow of material to completely empty the hopper. The bias spring 32 and the conical gasket, member 71 may also contribute to this slight pulsing vibration.

The spray gun also includes a downwardly extending handle 52 which slidably supports a trigger mechanism. The trigger mechanism includes the downwardly extended finger grip member 68 which is mechanically connected at one end of the guide rod 62. This guide rod is slidable along its axis and is supported by the adjustable threaded member 64 and a guide rod port 66 cast in the handle. The finger grip 68 is of an extended length to accommodate four fingers of the user. Thus, the finger grip member 68 is slightly shorter than the handle 52 but oversized to allow all fingers to maintain a trigger position. This oversized finger grip reduces hand strain particularly during long periods of use. On the opposite end of the guide rod is the lever 60 which is mechanically secured to and moves with the guide rod 62. This lever 60 includes a port 61 which receives the slide tube base 82 and is free to move therealong.

The lever 60 cooperates with the threaded thumb screw adjustment 34 and the threaded control valve 36. In normal operation, the lever 60 is fixed in position on the slide tube base 82 as it is trapped between the thumb screw adjustment 34 and the control valve 36. These components form a lock nut relationship with lever 60 trapped there between. Movement of the finger grip member 68 towards the handle 52 causes a corresponding movement of the slide tube 20 to an open position. This requires compression of the bias spring 32 and movement of the guide rod 62 relative to the handle portion 52. The trigger mechanism moves easily until the finger grip member 68 contacts the adjustable threaded stop and bearing 64. If the slide tube is in the closed position of FIG. 1, movement of the trigger mechanism towards the handle will cause opening of the port in the nozzle plate and the gun will assume an operative position. As can be appreciated, the threaded stop and bearing 64 allows the user to set a desired consistent maximum open position.

For some applications, it is desirable to provide a continuous open position of the slide tube relative to the nozzle. This can be accomplished by turning the thumb screw adjustment 34 to contact the threaded bearing 56 and thereafter start to move the slide tube 20 to an open position. The user can turn the spray gun on and off using the threaded control valve 36.

The threaded control valve 36 has an oversized threaded bore such that it can receive a large portion of the threaded end 38 of the slide tube base. The control valve 36 cooperates with the thread adjustment 34 and the lever 60 to provide a lock nut type arrangement. Basically the threaded member 34 may be positioned as generally desired and the lever 60 and the control valve 36 are located on the slide tube base to bring it into contact with the threaded member 34. The threaded member can then be rotated as the control valve is held and a compression lock between the two components is accomplished. This serves to lock both of the components and the lever 60 on the slide tube base 82 in the desired position. This relationship determines the off position and the finger grip member 68.

With the arrangement as shown in FIG. 1, the spray gun is easily disassembled for cleaning. Basically the control valve 36, the lever 60 and the threaded member 34 are removed from one end of the slide tube and the replaceable barrel sleeve 12 is released from the barrel portion by removing a screw member 18 which is holding the sleeve in place. This sleeve can be removed through one end of the barrel and the slide tube can be removed with it. As can be appreciated, no movement of the trigger mechanism is required as the lever 60 is slidable on the slide tube base 82. If necessary, the threaded slide bearing 56 can be removed from one end of the barrel.

The compression member 40 is typically removed with the barrel sleeve 12 as it merely is a compressable member which is compressed when the barrel sleeve is inserted in the barrel. It allows some movement of the barrel sleeve to allow easier securement of the barrel sleeve in the correct position within the barrel portion. It also acts as a further seal.

The conical gasket member 71 may be removed from the slide tube 20 for cleaning if desired.

As can be appreciated, the gun of FIG. 1 can have the different slide tubes for different applications. The slide tube includes a removable slide tube tip 25 which has a thread connection 80 with the slide tube base 82. The tip 25 is removable and can be replaced with a replacement tip having a larger or smaller air supply duct 22. Preferably, the spray gun is provided with two tips 25, one with a diameter of 1/8 inch and the other tip of a diameter of 3/32 of an inch. The smaller tip is typically used for heavier material. Three different nozzles can be used with a port size of one quarter of an inch, 5/16 of inch and 3/8 of an inch. The nozzle and the replaceable tip allow the user to vary the characteristics of the spray gun for a particular application.

The replaceable tips and nozzles allow the working spray ports of the gun to be changed easily. The slide tube is removed from the spray gun and the tip replaced.

The parallel orientation of spring loaded slidable tube 20 and guide rod 62 of the trigger mechanism provides a smoothed control movement of the slide tube 20 that is not prone to jamming. Furthermore, the cast port 66 is slightly oversized relative to the guide rod 62 to allow guide rod 62 some freedom of movement. Allowing additional play of the guide rod 62 and providing the bias force in line with the slide tube is particularly effective.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A spray gun for spraying plaster and other particulate material comprising:

a barrel portion having a chamber for containing material to be sprayed, an entrance into said chamber for receiving the material to be sprayed, a slidable tube for providing a source of compressed air to said chamber and extending out of a first end of said barrel portion, and a nozzle plate at a second end of said barrel portion opposite said first end and selectively closable by said slidable tube, said slidable tube including a spring bias member which is engaged by said slidable tube and is compressed by movement of said slidable tube away from said nozzle plate and providing a spring bias to close said nozzle plate, a handle portion extending downwardly from said first end of said barrel portion and containing a slidable trigger mechanism, said slidable trigger mechanism including a finger grip member fixed on a slide shaft which is generally parallel to said slidable tube, said slide shaft of said trigger mechanism including a connecting link member at an end of said shaft opposite said finger grip member, said link member being movable on said slidable tube and trapped between an adjustable stop member on said slidable tube and a further member secured on said slidable tube, said trigger mechanism when said finger grip member is moved towards said handle portion causing said link member to engage said further member and move said slidable tube away from said nozzle plate against said spring bias such that release of said finger grip allows said bias to automatically move said slidable tube to a closed position and in doing so return said trigger mechanism to an initial position.

2. A spray gun as claimed in claim 1 wherein said adjustable stop member is movable along said slidable tube to hold said slidable tube in an open position without actuation through said trigger mechanism.

3. A spray gun as claimed in claim 2 wherein said slidable tube has a threaded portion at one end thereof and said adjustable stop member is threaded on said threaded portion and is biased by said spring to bring said link member and said adjustable stop member to an initial position when said slide tube is closing said nozzle plate.

4. A spray gun as claimed in claim 3 wherein said handle portion includes an adjustable stop between said handle portion and said finger grip member to adjustably limit the extent said finger grip member can move towards said handle portion.

5. A spray gun as claimed in claim 2 wherein said adjustable stop member on said threaded portion of said slidable tube is adjustable to define different fully open positions of said slidable tube independent of said trigger mechanism.

6. A spray gun as claimed in claim 5 wherein said threaded portion of said slidable tube receives said further member which is a control valve, said control valve being adjustable to regulate the supply of compressed air through said slidable tube to the chamber of the barrel portion.

7. A spray gun as claimed in claim 6 wherein said control valve has an extended threaded port for engagement with said threaded portion of said slidable tube in various positions of said adjustable stop and forms a lock nut relationship with said link member and said adjustable stop to maintain a particular position thereof on said slidable tube.

8. A spray gun as claimed in claim 7 wherein said control valve is a fast shut off valve.

9. A spray gun as claimed in claim 7 wherein said barrel portion includes a threaded port at said first end thereof opposite said nozzle plate which is closed by a threaded bearing which slidably supports the slidable tube to allow passage therethrough.

10. A spray gun as claimed in claim 1 wherein said slidable tube is divided into a base portion and a removable tip portion, and said spray gun includes a series of removable tips of different sizes for varying the characteristics of the spray gun.

11. A spray as claimed in claim 10 including at least three replaceable nozzles.

12. A spray gun as claimed in claim 1 wherein said slidable tube is made of stainless steel.

13. A spray gun as claimed in claim 1 wherein said slidable tube is of a composite structure having a slide tube tip and slide tube base extending rearwardly from said slide tube tip, and wherein said tube base is made of a stainless steel.

14. A spray gun as claimed in claim 13 including a control valve having a thread connection with an end of said slide tube base.

* * * * *